ATMOSPHERIC STATIC SIMULATOR
Filed Sept. 6, 1944
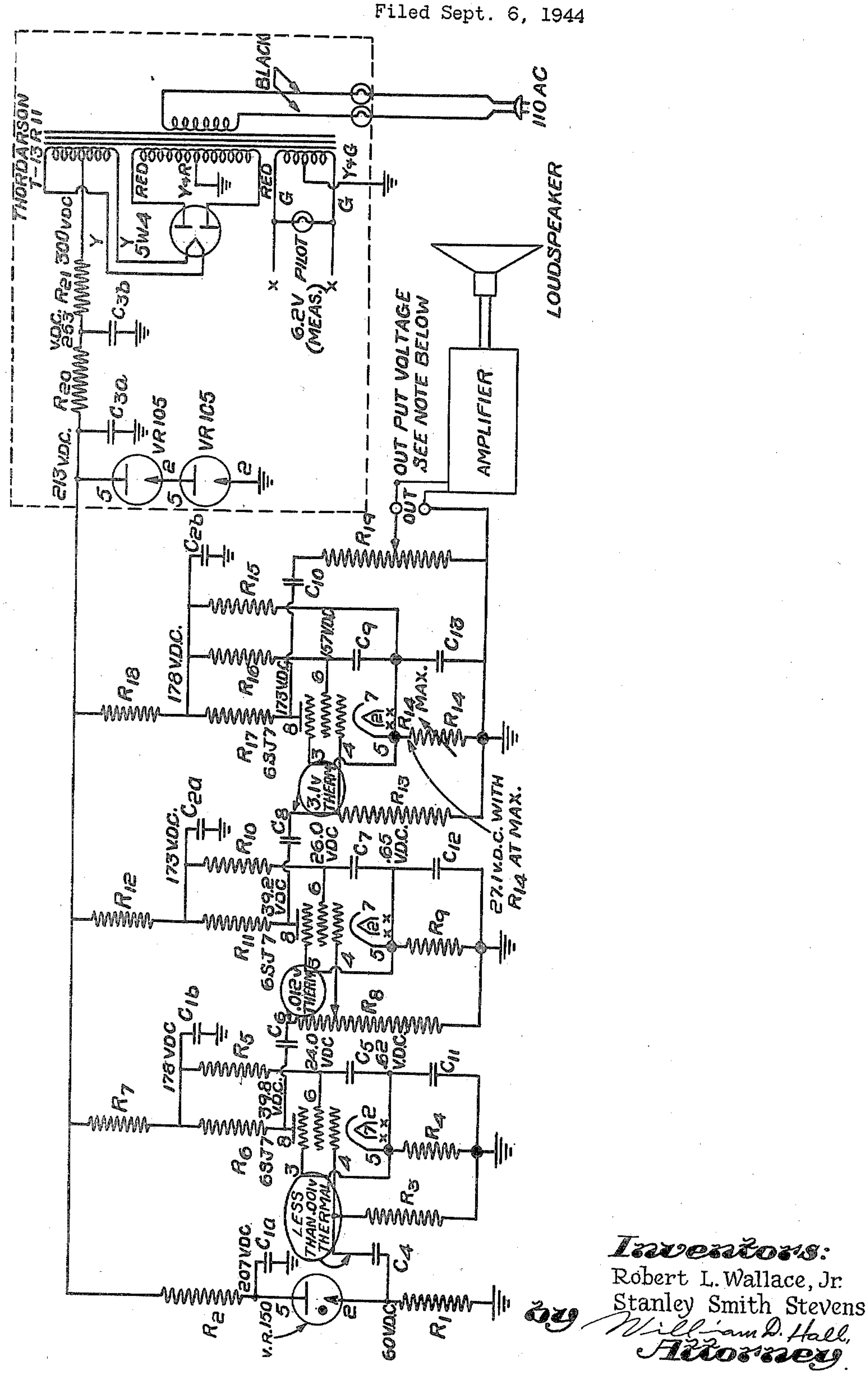
Inventors:
Robert L. Wallace, Jr.
Stanley Smith Stevens
by William D. Hall,
Attorney.

Patented Apr. 25, 1950

2,505,594

UNITED STATES PATENT OFFICE 2,505,594

ATMOSPHERIC STATIC SIMULATOR

Robert L. Wallace, Jr., Plainfield, N. J., and Stanley Smith Stevens, Cambridge, Mass., assignors to the United States of America as represented by the Executive Secretary of the Office of Scientific Research and Development Application September 6, 1944, Serial No. 552,922

6 Claims. (Cl. 250—27)

This invention relates to a method and apparatus for producing ambient noise and more especially to a method and apparatus for producing electronically simulated atmospheric static.

In connection with the development and testing of equipment utilized in the operation of aircraft, it is desirable to produce a sound field which corresponds as nearly as possible to atmosperic static encountered under actual flying conditions. An object of the invention, therefore, is to provide a method and apparatus for electronically producing atmospheric static. Another object of the invention is to provide means for adjusting frequency and other characteristics of the static referred to. Still another object is to indicate means for altering the static output.

The nature of the invention and its objects will be more fully understood from the following description of the drawings and discussion relating thereto.

In the accompanying drawings, the figure therein disclosed represents a wiring diagram in which is included circuit means for accomplishing the above noted objects.

The invention in general includes a method and apparatus for simulating static by passing a thermal noise signal, obtained from a gas discharge tube, through an amplifier which is biased beyond cutoff. In the drawings, we have illustrated a preferred embodiment of the apparatus in which a gas discharge tube is employed and so connected in the circuit that it produces an electrical output which contains all the frequencies in the audible range. The output of this tube is of the same random character as that produced by an imperfect electrical conductor such as a carbon resistor carrying a current which is subjected to heat and is for this reason commonly called "thermal noise."

The thermal noise output from the gas discharge tube is amplified and then passed through an amplifier stage which is biased well beyond cutoff. The signal amplitude fed to this stage is so adjusted and the degree of bias on the biased stage is so adjusted that the signal produced in its plate circuit consists of electrical pulses of very short duration. The amplitude of these pulses varies at random as a function of time, and the time interval between successive pulses varies at random as a function of time.

The signal at the plate of the biased amplifier is further amplified and then converted into sound by use of a loudspeaker or a headphone. The resulting audio signal obtained bears a close resemblance to that produced by atmospheric static in a radio receiver.

The wiring diagram indicated in the drawings illustrates a convenient circuit in which a gas discharge tube is connected. The first and second tubes work as an ordinary high gain amplifier and have a gain control R8. The third tube has a variable cathode resistor R14 which acts with R15 as a voltage divider in such a way that it can be biased well below cutoff. As an example the maximum bias may be as high as 27 volts. If R14 is worked in a "well advanced" position so that the bias is somewhere between 20 and 27 volts, then only the highest peaks of thermal noise can be passed provided gain control R8 is not advanced too much. A third gain control R19 is provided for adjusting the output of the device. This control has nothing to do with the "frequency" of the pulses or with their time of duration.

The "character" of the static can be altered by adjusting R8 and R14. If R14 is set at maximum resistance (this being the minimum dial reading) and R8 is advanced until the "frequency" of pulses is as desired, then the pulses are as sharp and "discrete" as they can be made with the circuit illustrated. The same "frequency" can be obtained, however, by reducing the dial reading of R8 (decreasing gain) and increasing the dial setting of R14 (decreasing bias). Reducing R8 setting and increasing R14 setting at the same time gives an output which approaches more and more toward being "thermal noise." For example, with R8 set at 4 on a conventional dial utilized for this purpose, and R14 set at about 8 or 9, the device functions satisfactorily to simulate atmospheric static as heard in a radio receiver.

The transformer, resistors, condenser, fuses and vacuum tubes shown within the dotted rectangle at the righthand side of the drawings comprise a circuit of conventional design which is used to supply direct current for the anodes of the other tubes in the circuit, and alternating current for the heaters of these tubes. Also shown at the righthand side of the drawings in diagrammatic form are means for utilizing the output voltage to reproduce the sound conditions desired. As may be noted from an inspection of the drawings, the output is first led to an amplifier and then to a loudspeaker.

The invention as illustrated by the wiring diagram of the drawing may be varied in various ways. For example, the method of coupling the gas tube to the amplifier which follows it may be changed and other modifications resorted to.

Having thus described our invention, what we claim is:

1. An electrical system for simulating atmospheric static comprising; a gas discharge tube for generating random voltage fluctuations, an amplifier for amplifying the random generator output, means for selecting audio frequency pulses of very short duration from the complex wave varying in random fashion in amplitude and spacing, said selecting means including an amplifier stage having at least one electron tube with its control grid biased well beyond cut-off to reject all voltage fluctuations whose amplitude is less than a predetermined value.

2. An electrical system for simulating atmospheric static comprising; a gas discharge tube for generating complex waves having a multiplicity of randomly disposed sharp pulses, an amplifier for amplifying the generator output, and means for modifying the output wave which includes selecting random audio frequency pulses of short duration and varying amplitude and spacing; said modifying means including an amplifier having an electron tube with its control grid biased well beyond cut-off to reject all pulses having an amplitude less than a predetermined value.

3. An electrical system for simulating atmospheric static comprising; a gas discharge tube for generating complex electrical waves containing randomly disposed sharp pulses, means for modifying the output of the gas discharge tube to accentuate the sharp pulses, said modifying means including an amplifier whose output stage is biased well beyond cut-off to reject pulses whose amplitude is less than a predetermined value.

4. An electrical system for simulating audio frequency atmospheric static comprising; a gas discharge tube adapted to generate complex waves having randomly disposed sharp pulses, an amplifier for amplifying the random pulses, means for modifying the structure of the amplified wave, and a loud speaker for converting electrical impulses into pulses of sound energy, said wave modifying means including an amplifier having an electron tube with its control grid biased well beyond cut-off to select high amplitude audio frequency pulses and reject lower amplitude high frequency components.

5. The method of simulating atmospheric static which includes passing a current through a gas tube to generate a complex noise wave and modifying the wave form by an amplifier having a high blocking bias to select the high amplitude audio frequency pulses and reject the lower amplitude high frequency components.

6. The method of modifying the complex noise wave generated by the passage of a current through a gas tube which includes applying the complex wave to the control grid of an amplifier tube having a high blocking bias to select the high amplitude audio frequency pulses and reject the lower amplitude high frequency components.

ROBERT L. WALLACE, Jr.
STANLEY SMITH STEVENS.

REFERENCES CITED

The following references are of record in the file of this patent:

UNITED STATES PATENTS

| Number | Name | Date |
|---|---|---|
| 1,480,217 | Mills | Jan. 8, 1924 |
| 1,957,269 | Hund | May 1, 1934 |
| 1,994,902 | Truant | Mar. 19, 1935 |
| 2,103,450 | DeVerter | Dec. 28, 1937 |
| 2,165,509 | Ring | July 11, 1939 |
| 2,183,248 | Riesz | Dec. 12, 1939 |
| 2,200,618 | DeVerter | May 14, 1940 |
| 2,207,620 | Hilferty | July 9, 1940 |
| 2,253,975 | Guannella | Aug. 26, 1941 |
| 2,354,699 | Owens | Aug. 1, 1944 |
| 2,416,307 | Grieg | Feb. 25, 1947 |
| 2,416,327 | Labin | Feb. 27, 1947 |